March 15, 1938.  R. D. GIVEN  2,111,423

SPEED REGULATION

Filed April 8, 1936

Inventor:
Ralph D Given,
by Harry E Dunham
His Attorney.

Patented Mar. 15, 1938

2,111,423

UNITED STATES PATENT OFFICE 2,111,423

SPEED REGULATION

Ralph D. Given, Leamington, England, assignor to General Electric Company, a corporation of New York Application April 8, 1936, Serial No. 73,317
In Great Britain October 22, 1935

3 Claims. (Cl. 171—119)

My invention relates to speed regulation and more particularly to the speed regulation of electric motors and motor generator sets although not limited to such machines.

An object of the present invention is to provide improved means for preventing an electric motor from overspeeding.

For a better understanding of my invention, together with other and further objects thereof, reference is had to the following description taken in connection with the accompanying drawing and its scope will be pointed out in the appended claims.

Figure 1:
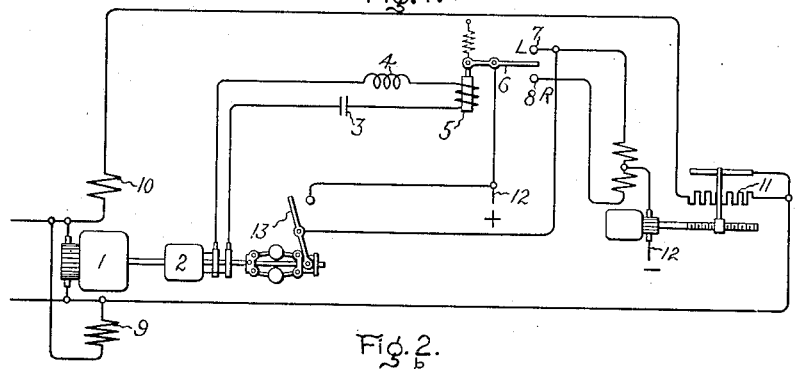
Figure 2:
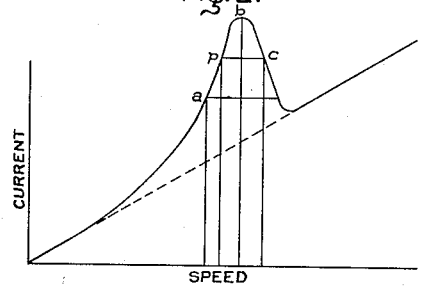
Figure 3:
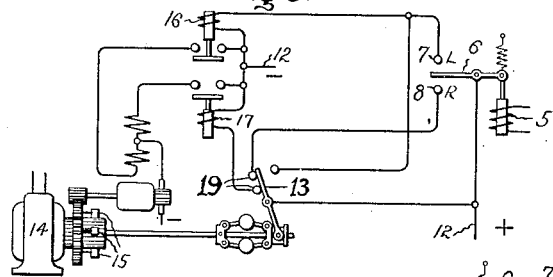
Figure 4:
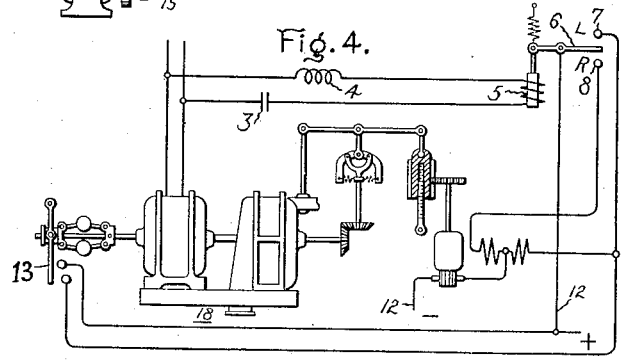

In the accompanying drawing, Fig. 1 is a diagram of the circuit of one form of my invention, Fig. 2 is a curve showing the speed-current characteristic of the control circuit, and Figs. 3 and 4 illustrate modified applications.

In Fig. 1 I have shown my invention as applied to a direct current shunt wound motor 1, the speed of which is to be regulated within close limits. Directly coupled to the motor 1 is a small alternator 2 connected in a circuit containing a capacitor 3, an inductive-reactance 4 and a relay 5. The relation between the current and speed of the alternator is shown in Fig. 2, the shape of the curve being due to the capacitor, reactance and resistance in the alternator circuit, the peak value $b$ of current occurring when the circuit is in resonance. The working range may be taken to lie between the points $a$ and $p$ on the curve and it is obvious from the steepness of the curve between these two points that a comparatively large change in current is obtained with a small change in speed, which is the condition needed for close speed regulation. The relay 5, which is operated by the current in the alternator circuit, makes contact between a moving contact 6 and a stationary contact 7 when point $p$ is reached and with a stationary contact 8 when the point $a$ is reached. The motor 1 is provided with a main field 9 and an auxiliary field 10 and in the circuit of the auxiliary field a motor-operated rheostat 11 is connected.

When contacts 6 and 7 are in engagement due to a rise in the speed of motor 1, current is supplied from a supply circuit 12 to the motor of the rheostat 11 and the field 10 is strengthened thereby reducing the speed of motor 1 until the connection between contacts 6 and 7 is broken. These contacts may therefore be referred to as the "lower" contacts. If, on the other hand, the speed of the motor 1 falls the contact 6 will engage contact 8 and the motor of the rheostat will drive it in the opposite direction so as to weaken the field 10 of motor 1 until the speed rises sufficiently and the engagement between contacts 6 and 8 is broken. These contacts may therefore be referred to as the "raise" contacts.

In the event of the load on the motor 1 being reduced suddenly by a large amount, the rheostat 11 may not respond rapidly enough to prevent the speed of the motor 1 and consequently the speed of the alternator 2 from rising to a point on the curve beyond $b$ and if the point $c$ were passed the relay would behave in the same manner as between points $a$ and $p$ since the current value would be the same as at some point between $a$ and $p$. The effect of the relay 5, however, would be the opposite to that required for correct speed regulation and the motor speed would not be returned to the correct value. The necessary condition for the speed to be brought back to its correct value is that once the speed rises beyond point $p$ the rheostat 11 will strengthen the field 10 for all speeds above $p$. To effect this I provide a centrifugal switch 13 which remains closed for all speeds above $p$ or if desired above $b$ or $c$. The effect of this centrifugal switch is to short circuit contacts 6 and 7 and so cause rheostat 11 to keep strengthening the field 10 for all speeds above the setting of switch 13. When the speed has been brought down to the speed for which the switch 13 is set to operate at the regulation is again taken over by the relay 5.

It will be seen that this invention is not limited to the speed regulation of direct current motors as above described by way of example but it can be utilized for any type of motor the speed of which can be controlled by any mechanism which could be put into operation by the contacts of relay 5. For example in Fig. 3 is illustrated a variable speed alternating current commutator motor 14 the speed of which is varied by moving the brushes 15. In place of the rheostat 11 driven by a small motor this motor is utilized to drive the brush gear. In the event of the contacts of relay 5 not being suitable for carrying the current for operating the small motor the relay 5 may control suitable contactors 16 and 17 capable of carrying the full motor current. To prevent positively any interference by the relay 5 with the action of the speed responsive switch 13 I provide this switch with a set of normally closed contacts 19 in series with the "raise" contact 8 so that when switch 13 operates, the circuit through the raise contact is opened independently of the relay 5.

As shown in Fig. 4, this invention may also be used for holding the frequency of a turbo-alternator 18, or an alternator driven by any prime mover, within close limits. In this case the small alternator 2 may be dispensed with and the tuned circuit may be supplied from the main alternating current supply which is to be regulated. The rheostat 11 is replaced by conventional mechanism operating on the ordinary speed governor gear.

While I have shown and described what I at present consider the preferred embodiment of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In combination, rotating apparatus, means driven by said apparatus for producing an alternating current whose frequency is proportional to the speed of said apparatus, a resonant circuit connected to said source of alternating current, electro-responsive means connected to be controlled by said resonant circuit, said electro-responsive means having a set of contacts which close when the frequency of said source of alternating current is slightly below the frequency causing the resonant peak in said resonant circuit and having another set of contacts which close when the frequency of said circuit is below the frequency at which the first set of contacts close, a reversible electric motor whose direction of operation is controlled by said contacts, means controlled by said motor for regulating the speed of said rotating apparatus, and a centrifugal switch operative to complete a circuit between the first mentioned set of contacts on said electro-responsive device when the speed of said rotating apparatus substantially exceeds the speed corresponding to the frequency at which said contacts are adapted to be closed by said electro-responsive device.

2. In an automatic regulating arrangement, means having a variable operating characteristic which is to be regulated within relatively close limits, means for producing an alternating potential whose frequency is a function of the value of said characteristic, a resonant circuit connected to be energized by said alternating potential, said resonant circuit having both values of frequency corresponding to the regulated limits of said variable characteristic on the same side of its resonant peak and below the resonant frequency thereof, means controlled by said resonant circuit for regulating the value of said characteristic in both directions, said means being relatively slow acting compared with the maximum speed at which said characteristic is capable of varying inherently whereby the resonant peak of said resonant circuit is subject to being passed to such an extent as to result in said resonant circuit controlled regulating means reversing its directions of regulation of said characteristic, and separate protective control means responsive to such abnormal conditions for restoring said characteristic to values to which said regulating means responds in the normal and correct direction.

3. In combination, apparatus having a variable operating characteristic to be regulated, regulating means responsive to a function of said characteristic for increasing said characteristic when it falls below a predetermined value and decreasing it when it rises above a predetermined value, said regulating means reversing its regulating effect when said characteristic exceeds one of its normally regulated predetermined limits by a predetermined amount, said reversing being to such an extent that said regulating means positively causes said characteristic further to exceed said one of its regulated limits, and auxiliary protective means responsive to said characteristic exceeding said one of its regulated limits by said predetermined amount for positively restoring said characteristic to a value at which said regulating means operates in the proper direction to maintain said characteristic within said predetermined regulated limits.

RALPH D. GIVEN.